United States Patent
Suzuki et al.

(10) Patent No.: US 6,461,208 B2
(45) Date of Patent: Oct. 8, 2002

(54) EXHAUST AND CONTROL FOR WATERCRAFT ENGINE

(75) Inventors: Akitaka Suzuki; Naoki Kinomoto; Tetsuya Mashiko, all of Shizuoka (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 0 days.

(21) Appl. No.: 09/211,959

(22) Filed: Dec. 15, 1998

(65) Prior Publication Data

US 2002/0049015 A1 Apr. 25, 2002

(30) Foreign Application Priority Data

Jun. 10, 1998 (JP) .......................... 10-162586

(51) Int. Cl.[7] .............................. B63C 9/08; B63H 21/22
(52) U.S. Cl. ............................................. 440/89; 440/1
(58) Field of Search ............................. 440/1, 88, 89

(56) References Cited

U.S. PATENT DOCUMENTS

| 4,019,489 A | * | 4/1977 | Cartmill ................. 123/198 D |
| 4,459,951 A | | 7/1984 | Tobinaga et al. |
| 4,475,502 A | | 10/1984 | Matsumoto |
| 4,695,822 A | | 9/1987 | Furukawa |
| 4,997,399 A | * | 3/1991 | Nakayasu et al. ........... 440/88 |
| 5,360,081 A | | 11/1994 | Takegami |
| 5,407,237 A | * | 4/1995 | Smolowitz ................... 285/31 |
| 5,531,619 A | * | 7/1996 | Nakase et al. ................. 440/1 |
| 5,536,189 A | | 7/1996 | Mineo |
| 5,554,057 A | | 9/1996 | Abe et al. |
| 5,632,443 A | * | 5/1997 | Quarrie ................. 237/12.3 C |
| 5,632,660 A | | 5/1997 | Nakase et al. |
| 5,720,693 A | * | 2/1998 | Mori ........................... 477/107 |
| 5,769,055 A | | 6/1998 | Motose et al. |
| 5,788,547 A | | 8/1998 | Ozawa et al. |
| 5,797,775 A | | 8/1998 | Ozawa et al. |
| 5,846,102 A | * | 12/1998 | Nitta et al. ..................... 440/1 |
| 5,911,609 A | * | 6/1999 | Fujimoto et al. ............. 440/89 |
| 5,928,044 A | | 7/1999 | Mineo |
| 5,934,958 A | | 8/1999 | Ochiai |
| 5,954,553 A | | 9/1999 | Ozawa et al. |
| 6,017,255 A | | 1/2000 | Nanami |
| 6,022,254 A | | 2/2000 | Neisen |
| 6,024,617 A | | 2/2000 | Smullin et al. |

* cited by examiner

Primary Examiner—S. Joseph Morano
Assistant Examiner—Andrew Wright
(74) Attorney, Agent, or Firm—Knobbe, Martens, Olson & Bear, LLP.

(57) ABSTRACT

A watercraft has an exhaust system. The exhaust system has a first portion cooled by cooling jackets and a second portion cooled by merged flow. The first portion is coupled to the second portion with a flexible coupling having an undulating surface. An overheat detection system is positioned proximate the flexible coupling. The overheat detection system is arranged to detect a rapid increase in temperature resulting from a blocked cooling jacket. During periods of normal operation, a first temperature reading is detected. During periods of abnormal operation, a rapid increase in temperature indicates a sudden decrease in cooling water within the cooling jacket. Warning signals are emitted to the operator by an overheat prevention unit to advise the operator of the condition.

56 Claims, 13 Drawing Sheets

EXHAUST AND CONTROL FOR WATERCRAFT ENGINE

BACKGROUND OF THE INVENTION

1. Field of the Invention

The present invention relates to an exhaust system. More particularly, the present invention relates to an exhaust system of a personal watercraft.

2. Description of Related Art

Internal combustion engines are used to power watercraft including watercraft commonly known as personal watercraft. Personal watercraft are generally distinguished from other types of watercraft by a characteristic open stem and a longitudinally extending straddle type seat. In fact, it is said that the operator sits upon a personal watercraft while the operator sits inside other watercraft.

Personal watercraft include a hull which defines an engine compartment. An engine is mounted within the engine compartment and is arranged to drive a water propulsion device. Specifically, the output shaft of the engine is coupled to a water propulsion device of the watercraft, such as a water jet propulsion unit.

The exhaust that is generated by combustion within the engine is routed through an exhaust system to a point external to the watercraft. Generally, the exhaust is discharged into the water in which the watercraft is operating proximate the stem of the watercraft. When the propulsion device is a water jet propulsion unit, the exhaust may be routed into the water that is being expelled from the jet propulsion unit. This results in a cleaner watercraft appearance as well as a decreased noise level associated with the watercraft.

The exhaust systems generally include a first portion that is connected directly to the engine. Exhaust flows from each combustion chamber of the engine through an exhaust discharge port into the first portion. A second portion of the exhaust system is often connected to the first portion and typically leads to the exhaust discharge location. The second portion generally comprises a water box and an exhaust pipe.

The first and second portions of the exhaust system are generally connected together with a coupling sleeve. This coupling sleeve preferably joins the two portions in a leak-resistant manner. The durable life of the coupling sleeve may be significantly shortened as a result of elevated temperatures and excessive vibrations within the exhaust system. Additionally, environmental hazards such as sea salt and the like also may reduce the resiliency and the life expectancy of the coupling sleeve. A combination of these elements may eventually cause the coupling sleeve to split, to crack or to otherwise fail, causing exhaust leaks in the exhaust system.

Moreover, in those instances where the coupling sleeve defines a portion of an exhaust system coolant jacket, a rupture of the coupling sleeve may cause a corresponding coolant jacket rupture. The rupture may result in high temperature coolant flow and possible flooding within the engine compartment or another compartment.

Additionally, the cooling jacket that envelops a substantial portion of the exhaust system is susceptible to plugging. For instance, small stones, sand buildups and plastic bags may become entrained within a portion of the cooling system and occlude a passage. As is known, coolant flowing through the coolant jacket may serve to cool the exhaust system as well as other components. Without adequate cooling, the exhaust system temperature may soar, possibly causing damage to temperature sensitive components within the engine compartment and the like. Additionally, when catalysts are used with the engine to reduce exhaust pollution, the catalyst temperature should be maintained in a desired operative range. Again, an improperly functioning cooling system can deteriorate the performance of such a catalytic device.

Thus, there exists a need for an overheat detection system which will quickly alert an operator to a cooling system malfunction. Additionally, there exists a need for an improved flexible coupling arrangement between the first and second portions of the exhaust system that will reduce vibration translation and heat conduction.

SUMMARY OF THE INVENTION

One aspect of the present invention involves a watercraft comprising a hull having an engine compartment. An internal combustion engine is mounted within the engine compartment. The engine comprises at least one cylinder and an exhaust system communicating with the cylinder. The exhaust system comprises a first portion and a second portion. The first portion is connected to the second portion by a flexible coupling member. The first portion has a water jacket defined between a first member and a second member and an exhaust passage defined by the first member. The first member has an opening such that the water jacket and the exhaust passage are in fluid communication. A sensor is mounted at a location that is not upstream of the opening and the sensor is configured to detect a temperature such that the sensor can detect a substantial blockage in the water jacket at substantially any location along the water jacket or another failure of a cooling system associated with the water jacket.

Another aspect of the present invention involves a watercraft comprising a hull having an engine compartment. An internal combustion engine is mounted within the engine compartment. The engine comprises at least one cylinder and an exhaust system communicating with the cylinder. The exhaust system comprises a first portion and a second portion. The first portion is connected to the second portion at least in part by a flexible coupling member. The exhaust system has a water jacket defined between a first member and a second member and an exhaust passage defined by the first member. The first member has an opening such that the water jacket and the exhaust passage are in fluid communication. The opening is positioned downstream of the flexible coupling. The exhaust system further comprises a sensor positioned near the opening. The sensor is configured to detect a temperature such that the sensor can detect a substantial blockage in the water jacket at substantially any location along the water jacket or another failure of a cooling system associated with the water jacket.

A further aspect of the present invention involves a watercraft comprising an engine and an exhaust system coupled to the engine. A cooling system is provided for cooling at least a portion of the exhaust system. The portion of the exhaust system cooled by the cooling system comprises an inner member and an outer member. A water jacket is defined between the inner member and the outer member. The water jacket comprises an inlet and an outlet. The inner member defines an exhaust passage. A sensor system is arranged to detect a substantial blockage in the water jacket. The sensor system comprises a sensor in electrical communication with an overheat prevention unit. The sensor is positioned near the outlet of the water jacket such that the sensor can detect a substantial blockage in the water jacket at substantially any location along the water jacket or another failure of a cooling system associated with the water jacket.

Another aspect of the present invention involves a watercraft comprising an engine and an exhaust system coupled to the engine. The exhaust system comprises a first portion and a second portion. A flexible coupling connects the first portion and the second portion. A cooling system extends along at least one of the first portion and the second portion of the exhaust system. The at least one of the first portion and the second portion of the exhaust system comprises an inner member and an outer member. A water jacket is defined between the inner member and the outer member. The water jacket comprises an inlet and an outlet. The inner member defines an exhaust passage. A sensor system is arranged to detect a substantial blockage in the water jacket. The sensor system comprises a sensor in electrical communication with an overheat prevention unit. The sensor is positioned not upstream of the outlet of the water jacket but is positioned at a location along the exhaust system such that the sensor can detect a substantial blockage in the water jacket at substantially any location along the water jacket or another failure of a cooling system associated with the water jacket.

A further aspect of the present invention involves an exhaust system for an internal combustion engine adapted for marine operation and mounted within a watercraft hull. The exhaust system comprises an exhaust conduit for conducting exhaust gases from the engine and being supported on the engine and a water lock through which the exhaust gases are passed outside of the watercraft. The water lock is supported on the hull. The exhaust conduit and the water lock are spaced from each other. A substantially straight flexible coupling connects the exhaust conduit with the water lock for passing the exhaust gases from the exhaust conduit to the water lock. The flexible coupling allows movement of the exhaust conduit and the water lock relative to each other. A short extension is attached to at least one of the exhaust conduit and the water lock and extends through at least a portion of the flexible coupling such that the flexible coupling is at least partially shielded from direct contact with the exhaust gases.

Another aspect of the present invention involves an exhaust system for an internal combustion engine adapted to a watercraft having a hull and a propulsion device carried by the hull and driven by the engine for propelling the watercraft. The engine is placed on the hull. The exhaust system comprises an exhaust conduit for conducting exhaust gases from the engine and a discharge conduit for discharging the exhaust gases outside of the watercraft. A coupling connects the exhaust conduit with the discharge conduit for running the exhaust gases from the exhaust conduit to the discharge conduit. Means are provided for carrying cooling water to the coupling. A temperature sensor also is provided for sensing temperature of the cooling water near an outlet of the means for carrying cooling water.

An aspect of the present invention also involves an exhaust system for an internal combustion engine adapted for marine use. The exhaust system comprises an exhaust conduit for conducting exhaust gases from the engine and a discharge conduit for discharging the exhaust gases away from the exhaust conduit. A coupling connects the exhaust conduit with the discharge conduit for running the exhaust gases from the exhaust conduit to the discharge conduit. Means are provided for shielding the coupling from the exhaust gases.

BRIEF DESCRIPTION OF THE DRAWINGS

Further aspects, features and advantages of the present invention will become apparent from the detailed description of several preferred embodiments. The illustrated embodiments are intended to illustrated, but not to limit, the present invention. The drawings contain the following figures.

DETAILED DESCRIPTION OF THE PREFERRED EMBODIMENTS OF THE INVENTION

The present engine exhaust and cooling systems have particular utility with a personal watercraft, and thus, the following describes the engine exhaust and cooling systems in the context of a personal watercraft. This environment of use, however, is exemplary. The present engine exhaust and cooling system can be readily adapted by those of skill in the art for use with other types of watercraft as well, such as, for example, but without limitation, small jet boats and the like, as well as for use in other applications.

Figure 1:
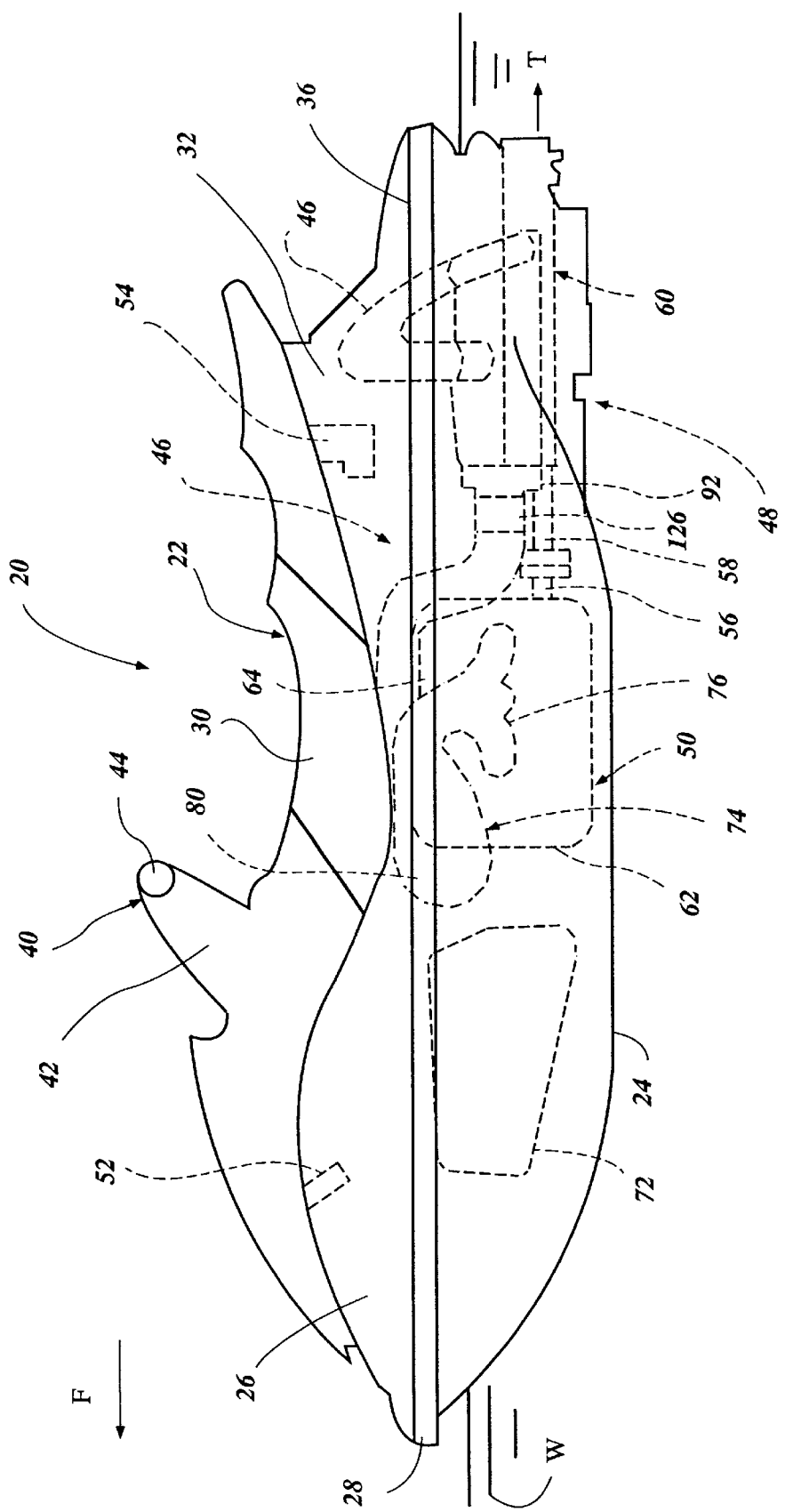
FIG. 1 is a side view of a first exemplary personal watercraft having certain internal component illustrated in broken line.
Figure 2:
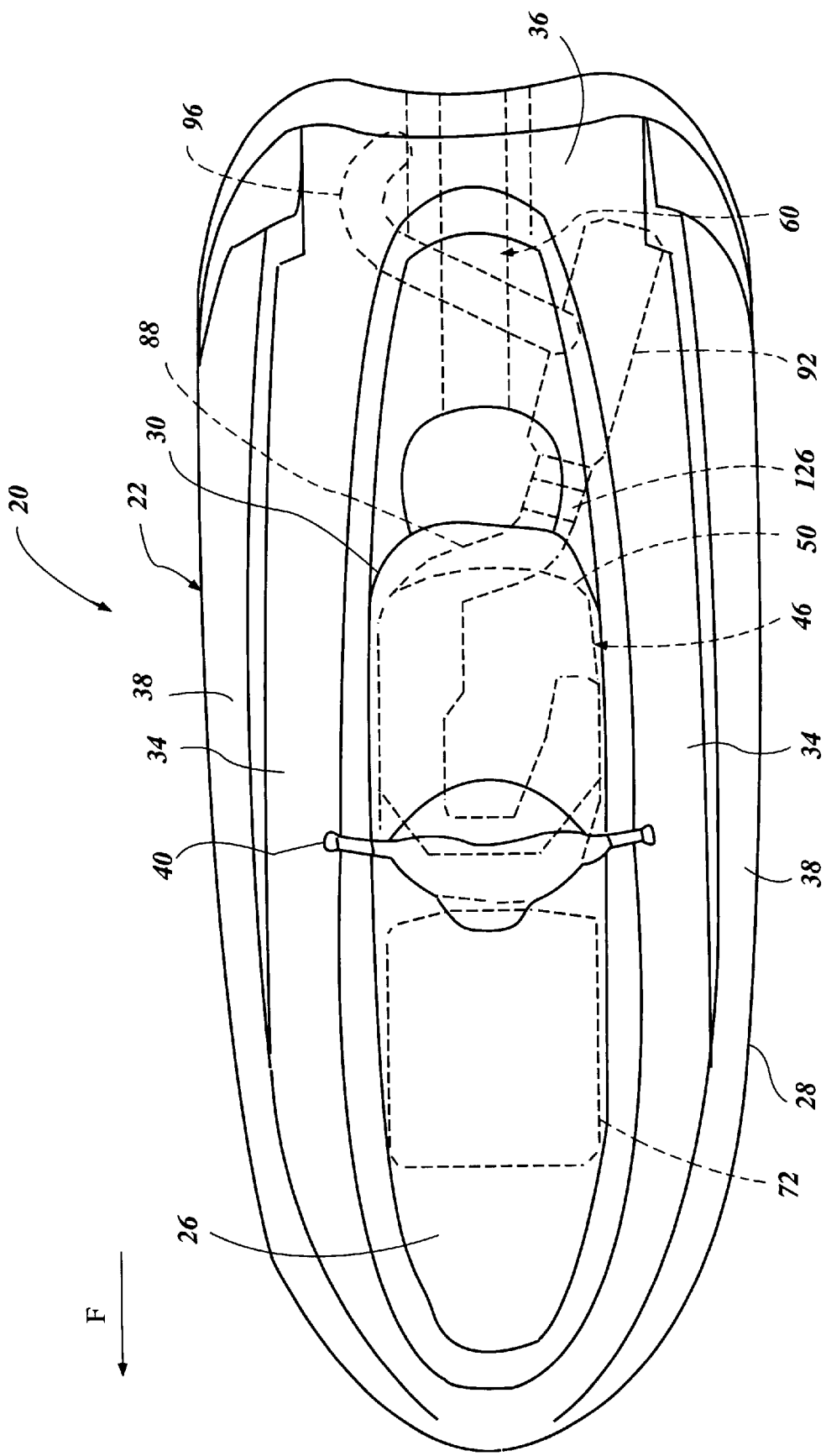
FIG. 2 is a top view of the watercraft of FIG. 1 again having certain internal components illustrate in broken line.

FIGS. 1 and 2 illustrate an exemplary watercraft 20. The illustrated watercraft 20 is desirably operated in a body of water designated by reference letter W in FIG. 1. In use, the watercraft 20 is propelled through the body of water W in a forward direction as designated by the arrow F in FIGS. 1 and 2.

The watercraft 20 is generally comprised of a watercraft body 22. The watercraft body 22 includes a hull 24 and a deck 26. A bond flange 28 is defined as the peripheral and overlapping mating section at which the hull 24 and the deck 26 are joined together. The bond flange 28 also identifies the location of a bond line that is an imaginary line around the watercraft 20 where the hull 24 and the deck 26 are joined together. Accordingly, the deck 26 generally comprises the upper structural body of the watercraft 20 that is located above and includes the upper bond flange 28.

A seat 30 is positioned on a raised pedestal portion of the deck 26 that is defined in part by a wrapping sidewall 32. The seat 30 may be connected to a removable deck member (not shown) in a known manner. With reference to FIG. 1, the seat 30 desirably extends longitudinally along the watercraft body 22 in a fore-aft direction. In this manner, the seat 30 is designed to be straddled by an operator, such that the operator places one leg on either side of the seat 30. The straddle-type seat 30 is characteristic of personal watercraft (i.e., a class of a watercraft defined, in part, as having an operator that sits, stands, or kneels, on, instead of in, a watercraft).

With reference now to FIG. 2, a pair of foot wells 34 define a platform area where the operator's feet may be placed. The foot wells 34 desirably extend between a front portion of the watercraft 20 through an open stem portion of the watercraft 20 to a boarding platform 36.

Both the foot wells 34 and the boarding platform 36 may be provided with a traction mat or a traction pad (not shown). A traction mat is a thin, rubber material bonded to the foot wells 34 or the boarding platform 36 of the watercraft 20. A traction pad is a thick rubber material bonded to the foot wells 34 or the boarding platform 36 of the watercraft 20. These elements result in increased traction for the operator as splashing water tends to decrease the level of traction available without any sort of traction pad or mat.

An operator may climb onto the watercraft 20 through an open stem of the watercraft 20. The two foot wells 34 and the boarding platform 36, in combination with the deck 28 and a pair of gunwales 38, define the opening in the stem. The gunwales 38 are vertical walls that surround the tray or foot wells 34 of the personal watercraft 20.

A steering mechanism 40 is arranged forward of the forward end of the longitudinally extending straddle-type seat 30. The steering mechanism 40 is designed to allow the operator to control the direction or tack of the watercraft 20 through the body of water W in which the watercraft 20 is being operated. Moreover, the steering mechanism 40 preferably includes a steering stem 42 and a throttle control 44. As will be recognized by those of skill in the art, the throttle control 44 may be any number of mechanisms designed to control a throttle valve associated with the engine. For instance, the throttle control 44 may be a rotatable grip actuator such as commonly used on motorcycles, a thumb throttle actuator which is a throttle actuating lever mounted on a handle bar and operated with the thumb similar to trigger or pedal throttle actuator, or any other suitable type of actuator.

The hull 24, in cooperation with the deck 26, contain a number of internal compartments which generally include an engine compartment 46 and a pumping chamber 48. Although not shown, a bulkhead may define a division between the engine compartment 46 and the pumping chamber 48, or any other compartments defined within the watercraft body 22. Desirably, the bulkhead is a structural reinforcement that is built into the watercraft's body 22.

An engine 50 is desirably positioned within the engine compartment 46 in approximately a central position and beneath an access opening (not shown) located on the deck 26. The access opening (not shown) may be selectively covered by a removable deck member to which the seat 30 is attached.

Although not shown, the engine 50 is desirably connected to the hull 24 via several engine mounts. The engine mounts (not shown) are connected to the bottom of the hull 24 in a known manner. For instance, the engine mounts (not shown) are connected to a pair of stringers, also not shown, which are connected to the bottom of the hull 24. The engine mounts (not shown) are connected to a lower portion of the engine 50 through a set of engine plates (not shown) in a known manner. Thus, the engine 50 is connected to the engine plates (not shown) which are in turn connected to the engine mounts (not shown) which are positioned along stringers (not shown) that run along the bottom surface of the hull 24.

Because the engine mounts preferably comprise resilient numbers, mounting the engine 50 in the aforedescribed manner reduces the transfer of engine vibrations through the hull 24 to the operator. Moreover, the shock absorbent engine mounting pads reduce the impact felt by the engine components as the hull 24 of the watercraft 20 bounces on the surface of the water W in which the watercraft 20 is used.

An air supply system ventilates the engine compartment 46 by supplying fresh air thereto. Such an air supply system desirably includes at least one air duct, and preferably at least two. For example, one air duct 52 is located toward a forward section of the engine compartment 46 while another air duct 54 is provided toward a rearward section of the engine compartment 46. Both ducts 52, 54 include an air inlet opening at an upper end that extends up into the deck 26 and a lower air outlet opening that terminates above the bottom surface of the engine compartment 46. The rear air duct 54 may also extend from beneath the seat 30.

The engine 50 is best illustrated in FIGS. 3–6. As illustrated therein, the engine 50 is preferably of the three-cylinder, two-cycle variety. Of course, the engine 50 may have as few as one or more than three cylinders and operate in accordance with other operating cycles such as the four-stroke cycle as may be appreciated by one of skill in the art. The illustrated engine 50 is configured with in-line cylinders which are inclined to one side of a central vertical plane. Thus, the overall vertical profile of the engine 50 may be reduced. Desirably, the line of cylinders extends parallel to a longitudinal axis of the watercraft 20. It should be recognized that a transverse configuration of the engine may also be used.

Figure 6:
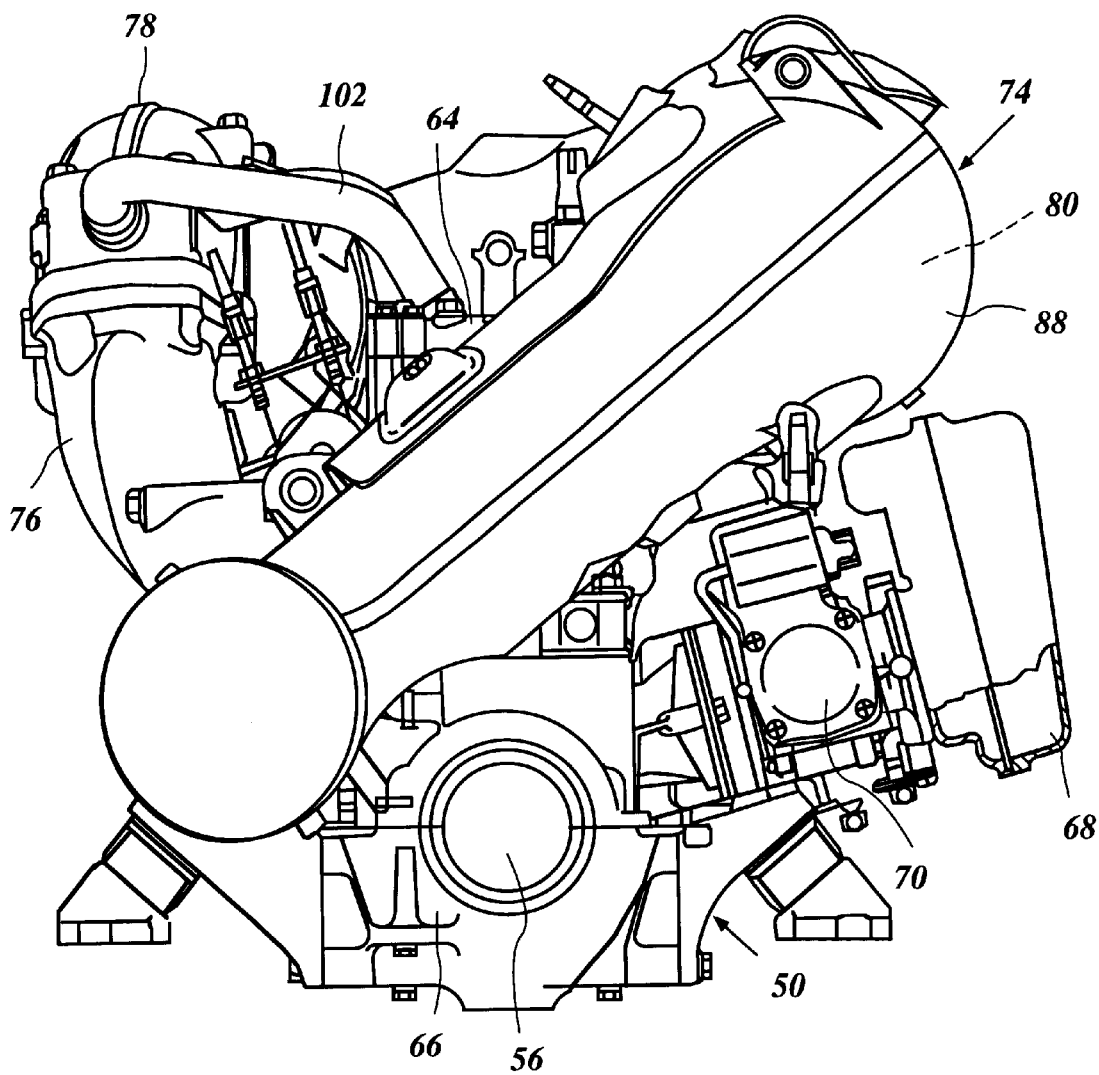
FIG. 6 is a rear view of the engine and the exhaust system of FIG. 3.

With reference to FIG. 1 and FIG. 6, the engine 50 has a crankshaft 56 that ultimately drives an impeller shaft 58 through known connections. The impeller shaft 58 is joined to an impeller (not shown) or a similar structure. The impeller (not shown) is associated with a jet propulsion unit 60 as illustrated in FIG. 1. The jet propulsion unit 60 is designed to propel water via the impeller (not shown) in a direction generally designated by the reference letter T to provide thrust.

The engine 50 also includes a cylinder block 62 having a cylinder head 64 connected thereto and cooperating therewith to define three cylinders (not shown) in the illustrated embodiment. A combustion chamber (also not shown) is defined by a cylinder wall (not shown) within the cylinder block 62, a recessed area in the cylinder head 64 and a top of a piston (not shown). The piston (not shown) is mounted for reciprocation within the cylinder and is connected to the crankshaft 56 via a connecting rod (not shown) as is well known in the art. Preferably, the engine 50 is tilted or inclined so that the combustion chambers have a center line that is offset in a first direction from a vertical axis. This arrangement helps keep the vertical profile of the engine 50 small which in turn allows the watercraft 20 to be designed with a low center of gravity.

The crankshaft 56 is constrained for rotational movement with respect to the cylinder block 62 within a crankcase. A crankcase cover member 66 extends from a bottom portion of the cylinder block 62 and, in combination with the cylinder block 62, defines the crankcase.

The engine 50 also includes an air intake and fuel mixture system. Preferably, this system is provided for delivering an air-fuel mixture for combustion within the engine 48. Accordingly, the air intake and fuel mixture system may communicate with each cylinder individually. The system draws air from within the engine compartment 46 into an air intake silencer 68. The air intake silencer 68 communicates with a carburetor 70 and a plurality of air intake pipes (not shown), each of which houses a butterfly-type throttle valve (not shown) therein. Preferably, each cylinder is fed through a separate air intake pipe.

Although not illustrated, a fuel supply system of the engine 50 desirably includes a fuel pump, delivery lines and, in some instances, return lines. Fuel is transferred from a fuel tank 72 positioned in a forward portion of the engine compartment 46 or in a separate forward compartment. A fuel pump (not shown) draws fuel from the fuel tank 72 and transfers it to a fuel bowl of the carburetor in a known manner. While the present invention is illustrated with a carbureted engine, fuel may also be provided to the incoming air with fuel injectors. The fuel injectors may be arranged for either direct injection or indirect injection as desired.

A suitable ignition system is also provided for igniting the air fuel mixture within the combustion chamber. Preferably, the system comprises a spark plug or other ignition element. A spark plug (not shown) is desirably arranged to extend through the cylinder head 64 as is well known to those of skill in the art. Desirably, the spark plug (not shown) corresponds to each combustion chamber and extends into the combustion chamber. Additionally, an appropriate ignition system control is desirably used to control the timing of the firing of the spark plug (not shown) to ignite the air and fuel charge A/F.

A flywheel (not shown) is desirably connected to one end of the crankshaft 56. The flywheel (not shown) may have a number of magnets thereon for use on a pulsar-coil arrangement for generating firing signals for the ignition system. In addition, the ignition system may include a battery (not shown) for use in providing power to an electronic starter or other electrical features associated with the watercraft and/or engine. In that case, a number of teeth may be positioned on the periphery of the flywheel for use in starting the engine with the starter motor in a known manner.

The engine 50 may also include a lubricating system that provides lubricating oil to the various moving parts of the engine 50. Such a system may include an oil tank or reservoir (not shown) from which lubricating oil is delivered and circulated, including for mixing with the fuel of a two-stroke engine as is well known to those of skill in the art.

Figure 3:
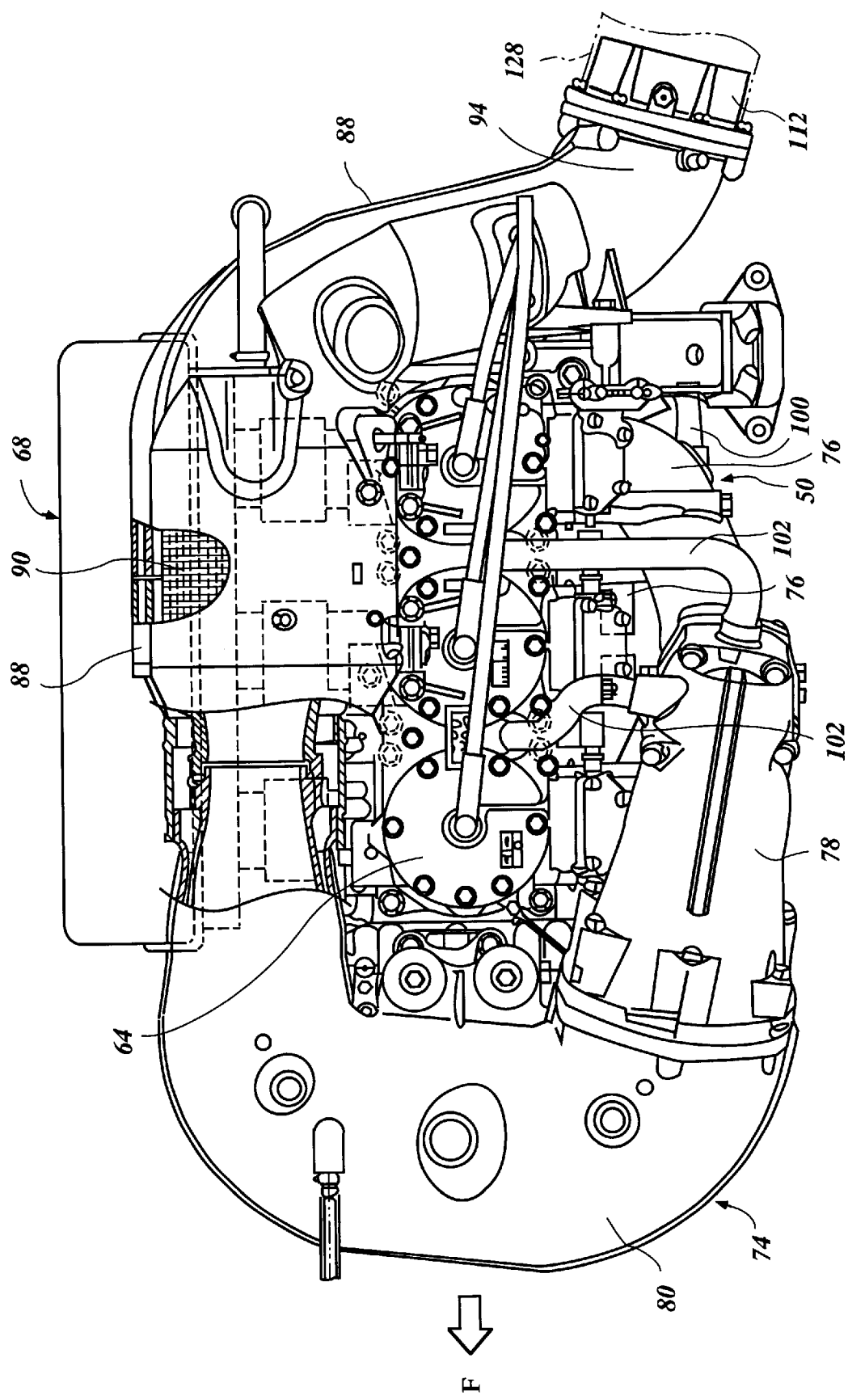
FIG. 3 is a top view of an exemplary engine having an exhaust system arranged and configured in accordance with the present invention.
Figure 4:
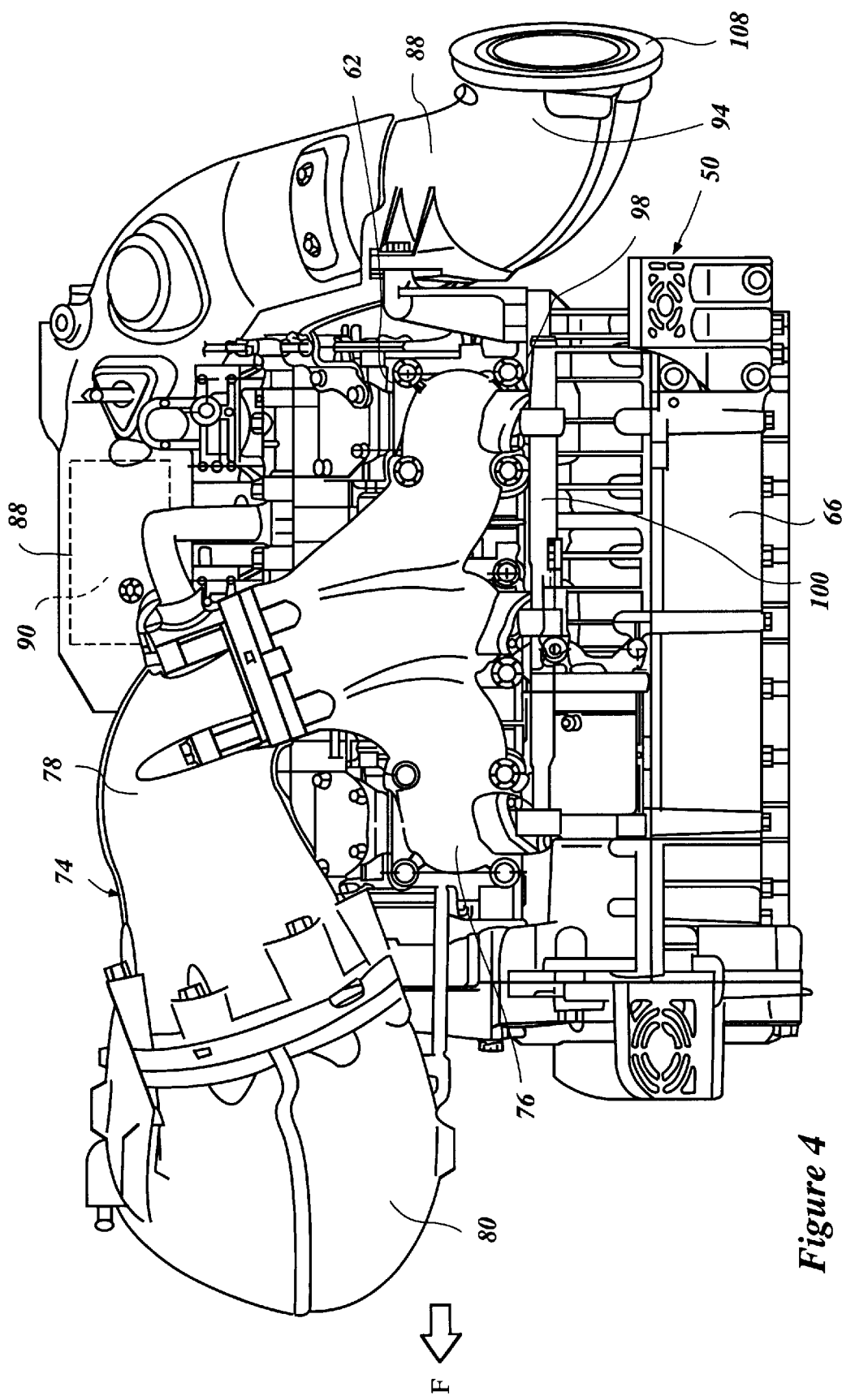
FIG. 4 is a side view of the engine and the exhaust system of FIG. 3.
Figure 5:
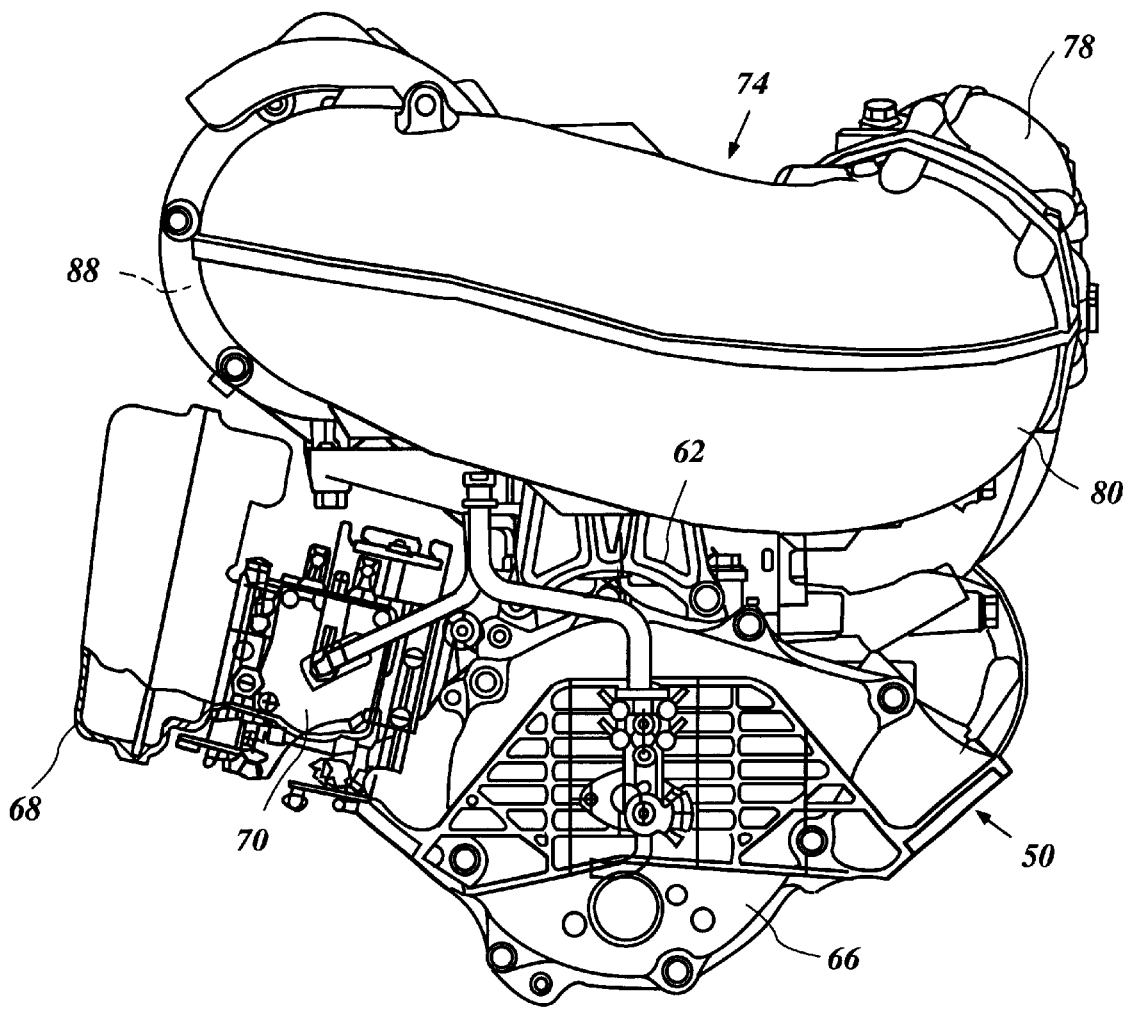
FIG. 5 is a front view of the engine and the exhaust system of FIG. 3.

Exhaust gas generated by combustion within the engine 50 is routed from the engine 50 to a point external to the watercraft 20 by an exhaust system 74. In general terms, the exhaust system includes an exhaust port (not shown) that extends through the cylinder wall or extends through the cylinder head. With reference now to FIG. 3, the exhaust system 74 also comprises an exhaust manifold 76 that combines the spent gases from each of the exhaust ports (not shown) of the cylinders. Desirably, the manifold 76 is connected to a side of the engine 50. The manifold 76 has branches or passages leading therethrough which are aligned with passages leading through the cylinder wall or cylinder head 64 and merge into a single passage. The merging of the branches of the exhaust manifold 76 is best illustrated in FIG. 4. As is also known, the exhaust system 74 may also comprise a plurality of individual pipes that exhaust the spent gases from the cylinders to a location external of the watercraft body.

The exhaust manifold 76 is in communication with a header pipe 78 that curves downward and towards the front of the engine 50. The header pipe 78 has a double wall construction which results in an internal exhaust passage which is substantially enveloped by a cooling water jacket, as is known. In the illustrated embodiment of FIGS. 3–6, the header pipe 78 expands in a downstream direction and is directly bolted to a first expansion chamber 80. The first expansion chamber 80 desirably wraps around a front portion of the engine 50 as best illustrated in FIG. 3.

The first expansion chamber 80 extends rearward along the side of the engine 50 opposite of the exhaust manifold 76. A distal end of the first expansion chamber 80 tapers to extend within a flexible coupling 82 which attaches the first expansion chamber 80 to a second expansion chamber 88. The second expansion chamber 88 extends rearward at generally the same elevational level as the first expansion chamber 80 for approximately the length of the engine 50, and then downward past the rear end of the cylinder block 62.

The second expansion chamber 88 desirably houses a catalyst 90. As is known, the catalyst 90 serves to remove harmful exhaust byproducts from the exhaust stream. As is also known, the exhaust flow through the exhaust catalyst 90 should be kept within a predetermined range in order for the catalyst 90 to have the desired effect on the exhaust byproduct flowing along with the exhaust flow.

Accordingly, the second expansion chamber 88 is also provided with a cooling jacket, which is in communication with the cooling jacket of the first expansion chamber 80. The second expansion chamber 88 includes an inner tube 82 and an outer tube 84, wherein the inner tube 82 forms an exhaust passage. A passage between the inner tube 82 and the outer tube 84 defines the coolant jacket that substantially envelops the exhaust passage extending through the second expansion chamber 88.

The distal portion of the second expansion chamber 88 decreases in diameter along its length downstream of the catalyst 90. Distally of the catalyst 90 housed within the second expansion chamber 88, the second expansion chamber 88 is connected to a water box 92 at its outlet 94 as illustrated in FIG. 1. Water may be injected into the exhaust stream proximate the water box 92 or the outlet 94 to help baffle and cool the exhaust flow. The diameter of the outlet 94 of the second expansion chamber 88 and the amount of water injected into the exhaust flow change the amount of exhaust back pressure. A smaller outlet 94 or an increased volume of injected water will typically increase top speed while sacrificing the lower end torque of the engine.

The illustrated outlet 94 is preferably connected to the water box 92 through a flexible coupling boot arrangement, which will be described in great detail below. The water box 92 desirably forms part of a final portion of the watercraft exhaust system 74 that mixes water and sound waves to muffle the exhaust noise. In addition, the water box 92 is provided with a plurality of baffles (not shown) which help retard back flow of water in a known manner in case of an engine stall. The outlet of the water box 92 is preferably connected to an exhaust pipe 96. The exhaust pipe 96 may be arranged to discharge the exhaust into the body of water W in which the watercraft is operating. Specifically, the outlet of the exhaust pipe 96 may be arranged within the propulsion passage or jet propulsion unit 60.

As introduced above, the watercraft 20 also may include a cooling system. The cooling system is preferably a liquid cooling system that draws cooling water from the body of water W in which the watercraft 20 is being operated. The cooling system circulates the cooling water through various cooling water jackets (not shown) in the cylinder block 62, the cylinder head 64 and the like. The cooling water is delivered to the engine through a pick-up line (not shown), which is in communication with an inlet 98 of a cooling water delivery line 100. The cooling water delivery line 100 is in fluid communication with cooling jackets that extend throughout the cylinder block 62 and the cylinder head 64 to deliver cooling water to the engine body.

With reference to FIGS. 3, 4 and 6, the cooling water is delivered from the cylinder block 62 to the exhaust system 74 via a set of connecting pipes 102. Accordingly, the proximal end of the connecting pipes 102 are connected to discharge couplings of the cylinder block 62 while the distal end of the connecting pipes 102 are coupled to water jackets extending around the exhaust system as discussed above.

Figure 7:
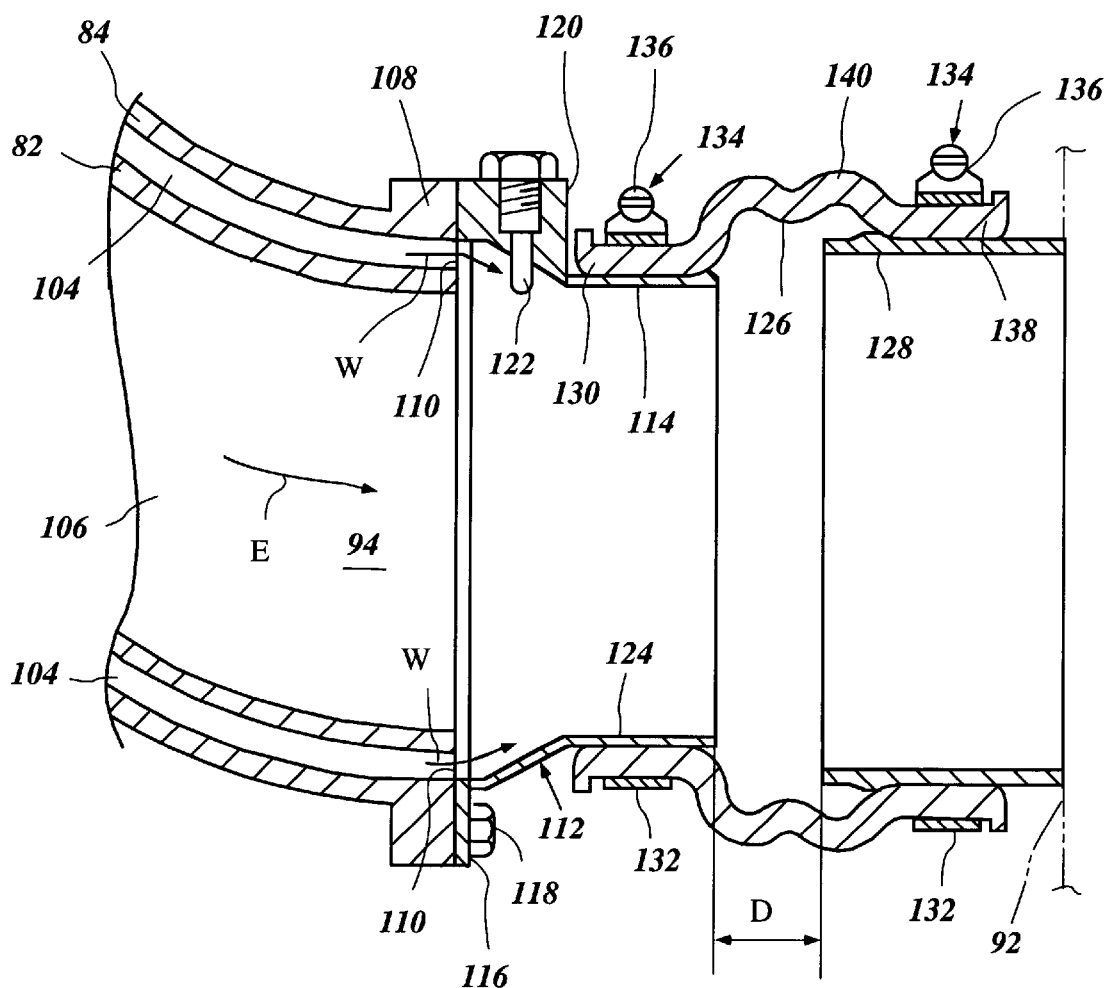
FIG. 7 is a cross-sectioned view illustrating a flexible coupling boot and an overheat detection sensor between a first portion of the exhaust system and a second portion of the exhaust system.
Figure 8:
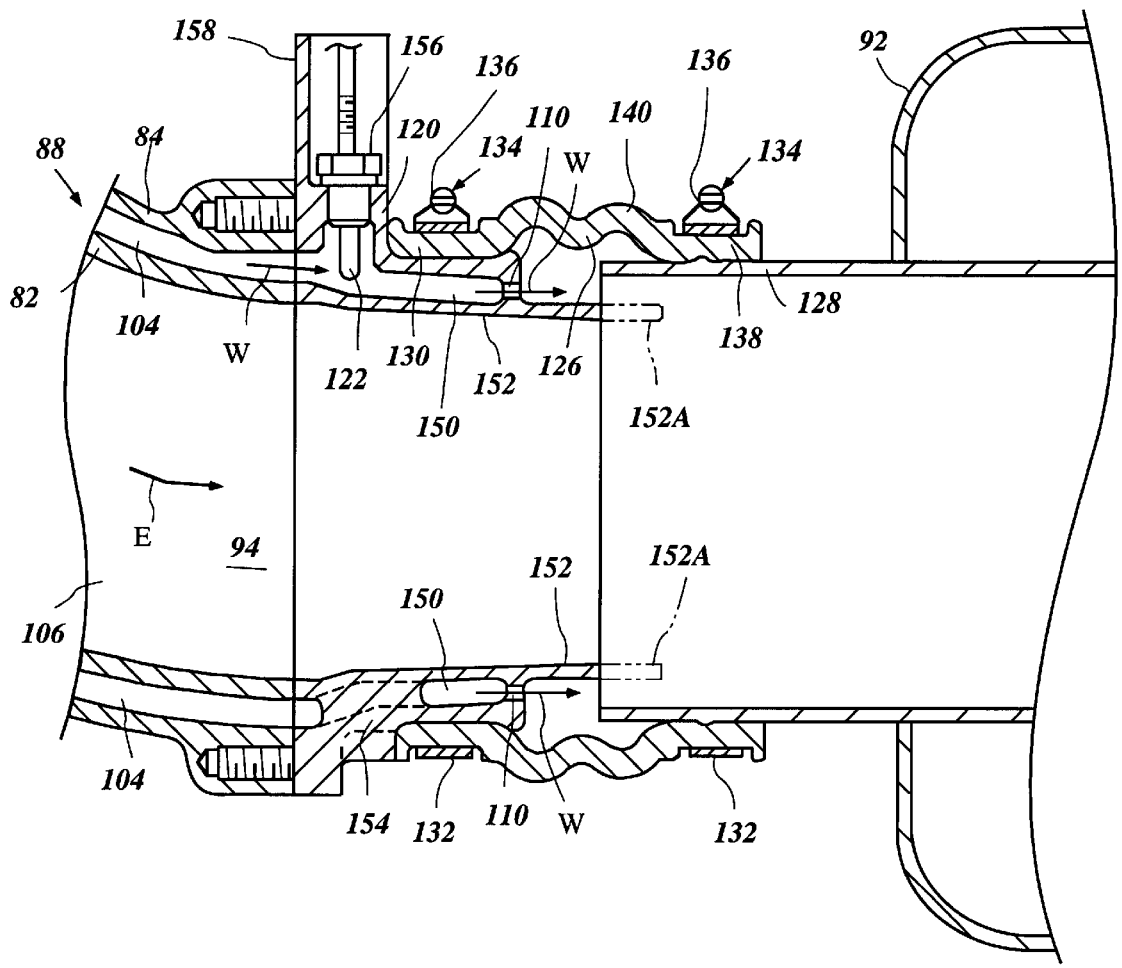
FIG. 8 is a cross-sectioned view of another arrangement of a flexible coupling boot and an overheat detection sensor arrangement arranged and configured in accordance with the present invention.

With reference now to FIGS. 7 and 8, two embodiments of the present invention are illustrated in which the cooling water flowing through the exhaust system cooling jackets is introduced into the exhaust stream flowing through the exhaust system. A water jacket 104 extending along a distal portion of the second expansion chamber 88 is illustrated in cross section in FIG. 7. The water jacket 104 is defined, as described above, by the inner tube 82 and the outer tube 84. The inner tube 82 also defines an exhaust passage through which the exhaust stream E flows.

At the distal extremity of the second expansion chamber 88, the second expansion chamber 88 is provided with a mounting flange 108. The mounting flange 108 is defined by a ring-shaped flare which extends substantially about the circumference of the distal extremity of the second expansion chamber 88. The mounting flange 108 may be provided with mounting apertures which are threaded or not threaded as desired. In the illustrated embodiment, the mounting flange 108 includes threaded apertures. Additionally, as best illustrated in FIG. 7, the distal extremity of the second expansion chamber includes a plurality of discharge ports 110 for the water jacket 104. The discharge ports 110 may take many shapes and configurations; however, in the illustrated embodiment, a spider-type of flange creates several passages which define the ports 110.

With reference to FIG. 7, an extension collar 112 desirably mounts flush with and abuts against the mounting flange 108. The extension collar 112 generally comprises a short tapered internal pipe 114 with a mounting ring 116 at its proximal end. Accordingly, the mounting ring 116 is desirably provided with through holes (not shown) which are substantially aligned with the mounting apertures of the mounting flange 108. Thus, the through holes and mounting apertures may be used to secure the extension collar to the distal end of the second expansion chamber 88 via threaded fasteners. Other methods of securing the extension collar 112 to the second expansion chamber 88 may also be used, such as, for example, but without limitation, clips which fasten over opposing surfaces to hold the members together.

The mounting extension collar 112 also may include a boss 120. The boss 120 provides a mounting location for a sensor 122 as illustrated. Accordingly, the boss 120 may be provided with a tapped hole which may removably secure the sensor 122 within the boss 120. Preferably, a distal end of the sensor 122 is positioned such that the cooling water W exiting the distal end of the water jacket 104 through the discharge ports 110 may impinge upon it to maintain it at a cooler temperature than the exhaust gases flowing through this portion of the exhaust system 74. The sensor 122 may be inserted partially into water jacket 104, upstream or downstream of the discharge ports 110. Additionally, it may be desirable to mount the sensor 122 such that the distal tip of the sensor 122 does not extend into the exhaust passages 106.

Accordingly, in the event of a plugging of the water jacket 104 which substantially inhibits the flow of cooling water W therethrough, the exhaust gases will be permitted to have an unfettered interaction with the distal end of the sensor 122. Due to the temperature differences between the cooling water W and the exhaust gases E, the sensor 122 will immediately output a sudden rise in the sensed temperature without requiring a heating of an intermediate pipe member. Thus, the positioning of the sensor allows warning and attention to the situation before substantial damage can be done to the engine and the related components and systems.

A distal portion of the extension collar 112 also provides a mounting surface 124 for a flexible coupling boot 126 which couples a first portion of the exhaust system 74 to an inlet pipe 128 of the water box 92 and the second portion of the exhaust system 74. The flexible boot 126 bridges the distance D between the first portion of the exhaust system and the second portion of the exhaust system. This distance D allows the flexible boot 126 to compensate for thermal expansion of the components. The flexible boot 126 also decreases vibrational conduction between the first portion of the exhaust system which is rigidly coupled to the engine and the second portion of the exhaust system which is not.

The proximal end 130 of the flexible boot 126 is secured to the mounting surface 124 of the extension collar 112 via a pipe clamp strap 132 in a known manner. As is known, a pipe clamp 134 generally comprises the strap 132 and a tightening member 136, such as that illustrated with a flat head screw. As will be apparent to those of skill in the art, any other suitable means of removably coupling the flexible boot 126 to the mounting surface 124 of the extension collar 112 may also be used.

The distal end 138 of the flexible boot 126 may also be removably coupled to the inlet 128 to the water box 92. In the illustrated embodiment, a second pipe clamp 134 also serves the purpose of coupling these two members.

Between the pipe clamps 134, the flexible boot 126 is desirably accordion-shaped or provided with an undulating surface 140 of substantially constant cross section similar to a billows. This undulating portion 140 provides the necessary compensation to accommodate relative thermal expansion of the exhaust system portions as well as to damp vibration.

With reference now to FIG. 8, another embodiment of the flexible coupling and the overheat detection system arranged and configured in accordance with the present invention is illustrated therein. In the following description of this embodiment, like elements will be given like reference numbers to simplify the discussion. Moreover, also to simplify the discussion, the above-description will be considered to apply to this embodiment unless otherwise stated.

Similar to the embodiment described in detail above, the second expansion chamber 88 has a the water jacket 104 which extends to its distal end. In this embodiment, however, the water jacket 104 of the second expansion chamber is in fluid communication with a water jacket 150 of the extension collar 112. Accordingly, the extension collar 112 is also double walled with an internal wall 152 and an external wall 154. The gap between the internal wall 152 and the external wall 154 define the water jacket 150.

The discharge ports 110 from the cooling jackets 104, 150 have, accordingly, been shifted to the extension collar 112 and provide an egress for the cooling water W flowing through the cooling jackets 104, 150. In the illustrated embodiment, the internal wall 152 of the extension collar 112, which wall in part helps define the cooling jacket 150, desirably extends downstream of the egress discharge port. As illustrated in phantom line, the internal wall 152 may stop at or near the proximal extremity of the inlet pipe 128 or the internal wall 152A may extend into the proximal end of the inlet pipe 128. The illustrated inlet pipe 128 again is coupled to the extension collar 112 in the same manner as that described above: using the flexible boot 126.

Additionally, the illustrated temperature sensor 122 is provided with a threaded mounting portion 156 which allows insertion and removal. The sensor 122 is thus secured in position within the mounting boss 120. Moreover, in the embodiment illustrated in FIG. 8, the extending collar 112 is provided with an outwardly extending rib 158. The outwardly extending rib 158 may be used for mounting purposes or to protect the portion of the temperature sensor 122 which extends outward of the mounting boss 120.

With reference now to FIGS. 9–13, another embodiment of the present invention will be described within a slightly different exemplary exhaust system environment. Because much of the watercraft and the components illustrated in FIGS. 9–13 are common to the watercraft of FIGS. 1–8, like reference numerals will refer to like components. Moreover, the above-description will also apply to FIGS. 9–13 unless otherwise indicated.

Figure 9:
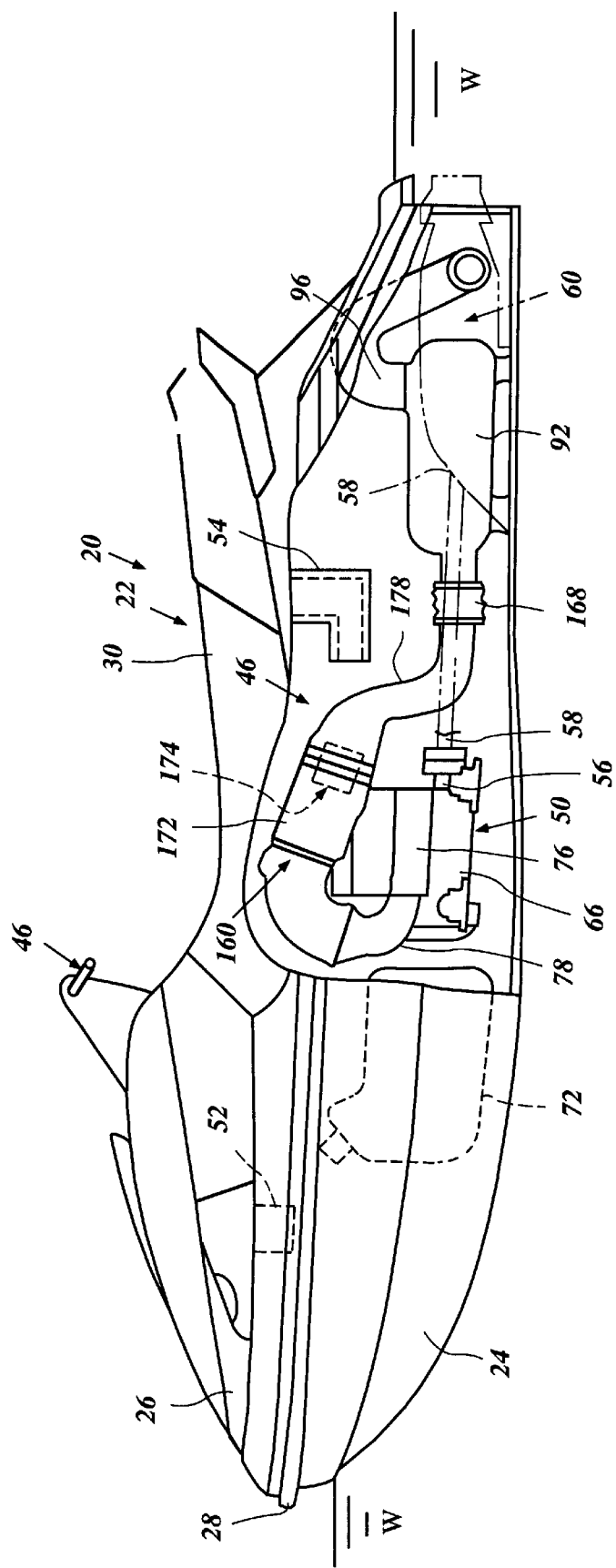
FIG. 9 is a partially sectioned side view of a second exemplary personal watercraft illustrating another engine and another exhaust system having a flexible coupling boot and an overheat detection system having features and advantages in accordance with the present invention.

With reference now to FIG. 9, the watercraft is driven by the internal combustion engine 50. The combustion of an air and fuel charge within the combustion chamber generates exhaust gases. The exhaust gases are discharged from the cylinder block via an exhaust system 160. Generally, the illustrated exhaust system originates at an exhaust discharge port (not shown) which extends through a wall of the cylinder or cylinder head depending upon the type of engine with which the exhaust system is utilized. As the illustrated engine is a three cylinder, four-stroke style of engine, the exhaust discharge port extends through a portion of the cylinder head.

With reference to FIG. 9, the exhaust system also generally comprises an exhaust manifold 76 that combines the spent gases from each of the exhaust ports of the cylinders. Desirably, the manifold 76 is connected to a side of the engine and has a pair of branches with passages leading therethrough aligned with the passages leading through the cylinder wall or head and merging into a single passage. As is known, the exhaust system can also comprise a plurality of individual pipes that exhaust the spent gases from the cylinders to a location external of the watercraft body.

Figure 10:
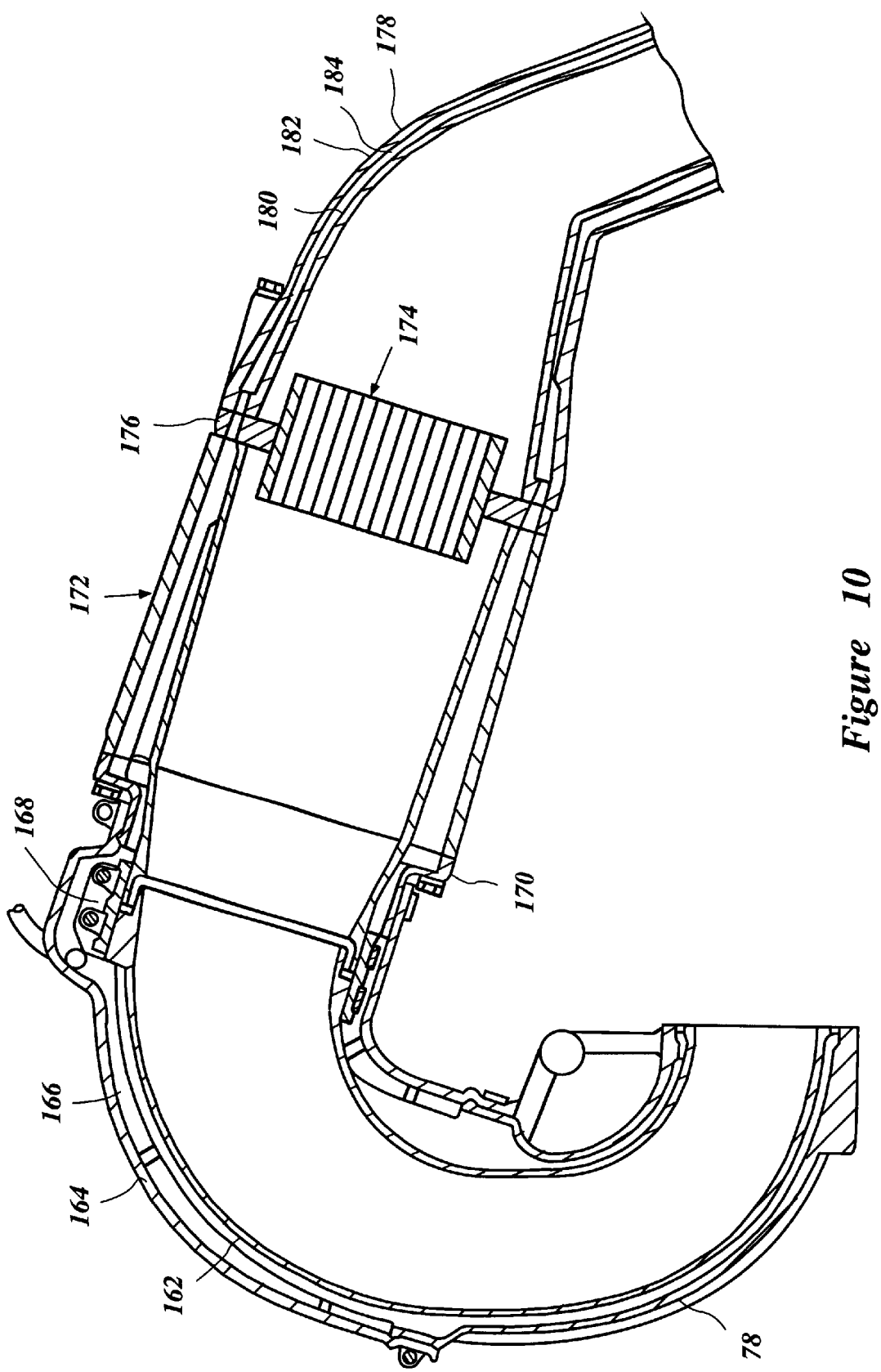
FIG. 10 is a cross-sectioned view of a portion of the exhaust system illustrating a catalyst positioned within an expansion chamber of the exhaust system.

The exhaust manifold 76 is in communication with a header pipe 78 that preferably curves upward and over the front end of the engine. With reference now to FIG. 10, the header pipe 78 may be provided with a cooling water jacket around the shell of the exhaust pipe. Thus, with reference to FIG. 10, an inner pipe 162 is surrounded by an outer pipe 164, as discussed above, to define a coolant passage 166. In this manner, the header pipe 78 helps lower the engine 50 and exhaust system 74 temperatures.

A flexible coupling 168 may connect the header pipe 78 to a diffuser cone 170. The diffuser cone 170 shapes a sonic wave as the exhaust is exiting the diffuser cone 170. In addition, it shapes a return exhaust port-plugging wave to help keep the fresh fuel and air mixture from escaping the combustion chamber of the cylinder.

Preferably, the diffuser cone 170 is, in turn, connected to the main expansion chamber body 172. The main expansion chamber body 172 is an enlarged exhaust passage and forms one of the key tuning variables of a performance exhaust system. As is known by those of skill in the art, changing the length or diameter of the expansion chamber will change the RPM where the most horsepower is produced. A catalyst 174 may be positioned within the expansion chamber using a mounting flange 176 as is known. Desirably, the main expansion chamber body 172 also has a double wall configuration which defines a cooling jacket along at least a substantial portion of its length.

In the illustrated exhaust system, the main expansion chamber body 172 is in turn connected to a converging cone 178. The converging cone, as well, is desirably comprised of an inner tube 180 and an outer tube 182. The gap between the inner tube 180 and the outer tube 182 define a water jacket 184 about the converging cone 178. The converging cone ensures that the exhaust and the sonic wave produced by the exhaust bounces off the converging cone and returns to help plug the exhaust port.

The illustrated converging cone is in turn connected to a stinger 186. The stinger, as with the above-described cooling system components, also is basically comprised of an inner tube 188, an outer tube 190, and a coolant passage 192 therebetween. The stinger 186 is the location where the exhaust stream E exits the tuned part of the exhaust system 160 before the exhaust stream enters the water box 92 through the inlet pipe 128. Water may be injected into the exhaust at the stinger 186 to help baffle and cool the exhaust flow. The diameter of the stinger 186 and the amount of water injected into the stinger 186 change the amount of exhaust back pressure. A smaller stinger 186 or a lot of injected water will typically increase top speed while sacrificing the lower end torque.

The illustrated stinger 186 is preferably connected to the inlet pipe 128 of the water box 92, as discussed above, through a flexible coupling boot 126. The outlet of the water box 92 is preferably connected to the exhaust pipe 96. The exhaust pipe 96 is desirably arranged to discharge the exhaust into the body of water W in which the watercraft 20 is operating. The outlet of the exhaust pipe 96 may be arranged within the propulsion passage or jet propulsion unit 60.

Figure 11:
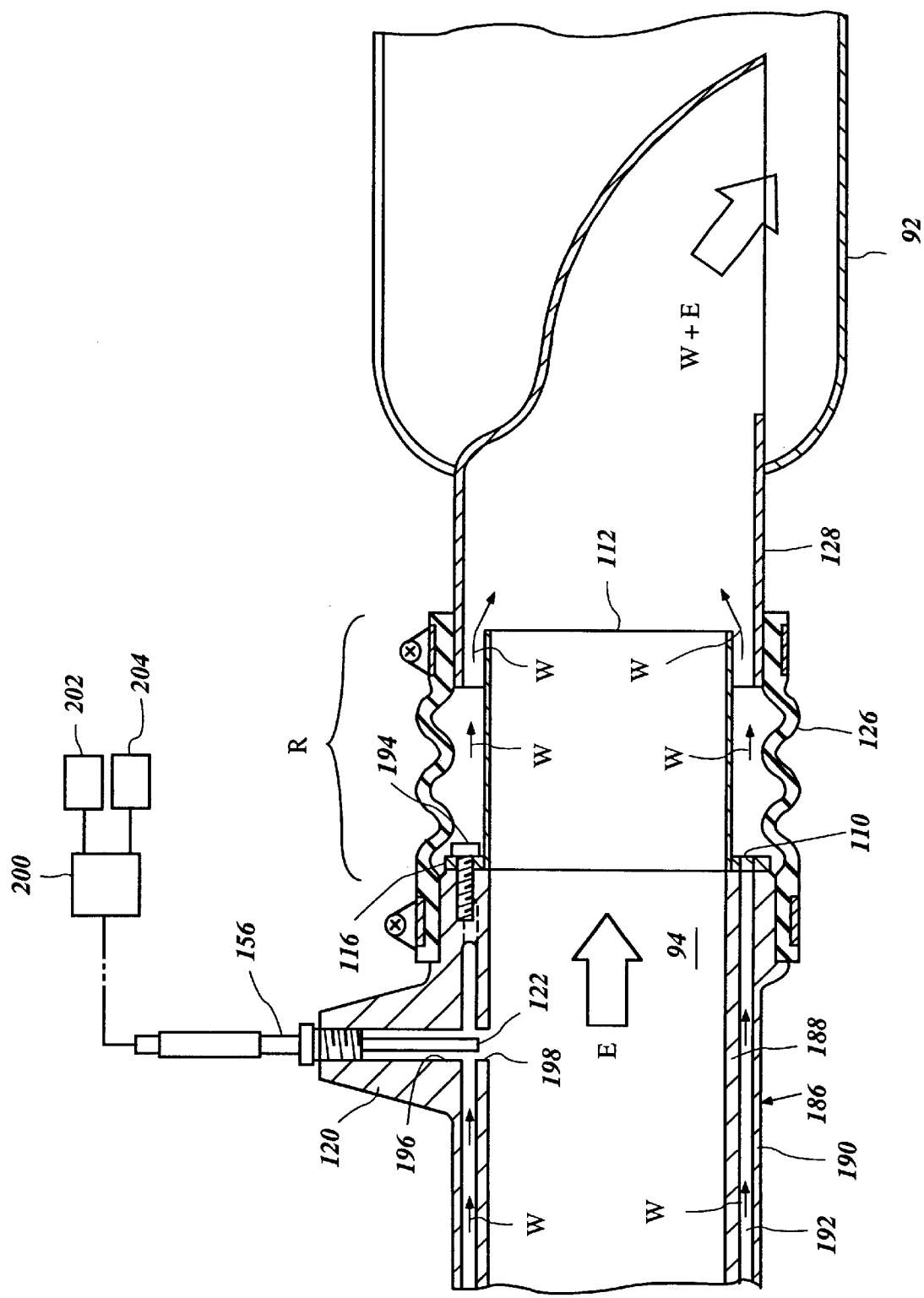
FIG. 11 is a cross-sectioned view of a flexible coupling boot and an overheat detection sensor arranged and configured in accordance with the present invention.

With reference now to FIG. 11, the flexible coupling boot 126 between the distal end of the stinger 186 and the water box inlet pipe 128 will be described in detail. Additionally, an overheat detection sensor arrangement will also be described. As illustrated, the stinger 186 desirably continues the double wall construction of the exhaust system to its distal extremity. Accordingly, a water jacket 192 envelops the stinger 186 along its length.

In the exhaust system of FIG. 11, the extension collar 112 forms an extension of the inner tube 188. The illustrated extension collar 112 generally comprises a mounting ring 116 having mounting apertures (not shown) and at least one discharge port 110. The extension collar 112 is preferably secured to the end of the stinger 186 using threaded fasteners 194 or is otherwise affixed thereto by any suitable technique.

Preferably, the extension collar 112 has a series of water jacket discharge ports 110 extending through the mounting ring 116. As will be recognized, the inner tube 188 could extend distally of the outer tube 190 and a flange could be used to cover the end of the water jacket to lend support as well as serve as a flow restrictor plate if desired. This flange could be an alternative to the mounting ring 116 of the extension collar 112 or used in conjunction therewith.

The illustrated mounting ring 116 has a plurality of through holes which allow the coolant to pass through into the gap defined between the flexible sleeve and the inner shell extension. Thus, the inner tube 188 effectively extends beyond the outer tube 190 to allow the cooling water to remain in the water jacket 192 through the coupling region R. To accomplish this coupling water jacket structure, the flexible boot 126 joins the outer tube 190 to the water box inlet pipe 128 by mounting over a portion of each pipe. The inner tube extension preferably terminates within the inlet pipe 128 as illustrated. It is also anticipated, however, that the inner tube extension could stop proximal to the inlet pipe 128.

The flexible boot 126, as described above, is secured in position with a pair of pipe clamps 134 in the illustrated embodiment. As will be recognized by those of skill in the art, other suitable coupling methods may also be used.

To provide a more rapid response to blocked coolant flow, an overheat sensor 122 is positioned near the distal end of the stinger 186. The sensor 122 is desirably a thermocouple which is removable mounted within an aperture 196 in the mounting boss 120. The aperture 196 may be provided with internal threads to allow the sensor 122 to be threaded into position via threads on a mounting stem 156 portion. Other types of temperature sensors may also be used. The mounting boss 120 is desirably formed proximate the distal end of the stinger 186; however, other regions of the exhaust system 160 may also be used. The positioning near the cooling jacket discharge ports 110 allows the sensor 122 to detect, as will be described, a blockage at any location throughout the majority of the cooling system 160. Additionally, by locating the sensor and the related structure distant from the catalyst, coolant which may become entrained within the exhaust flow is unlikely to contact the catalyst, even in the back surge of a two-stroke application.

Figure 12:
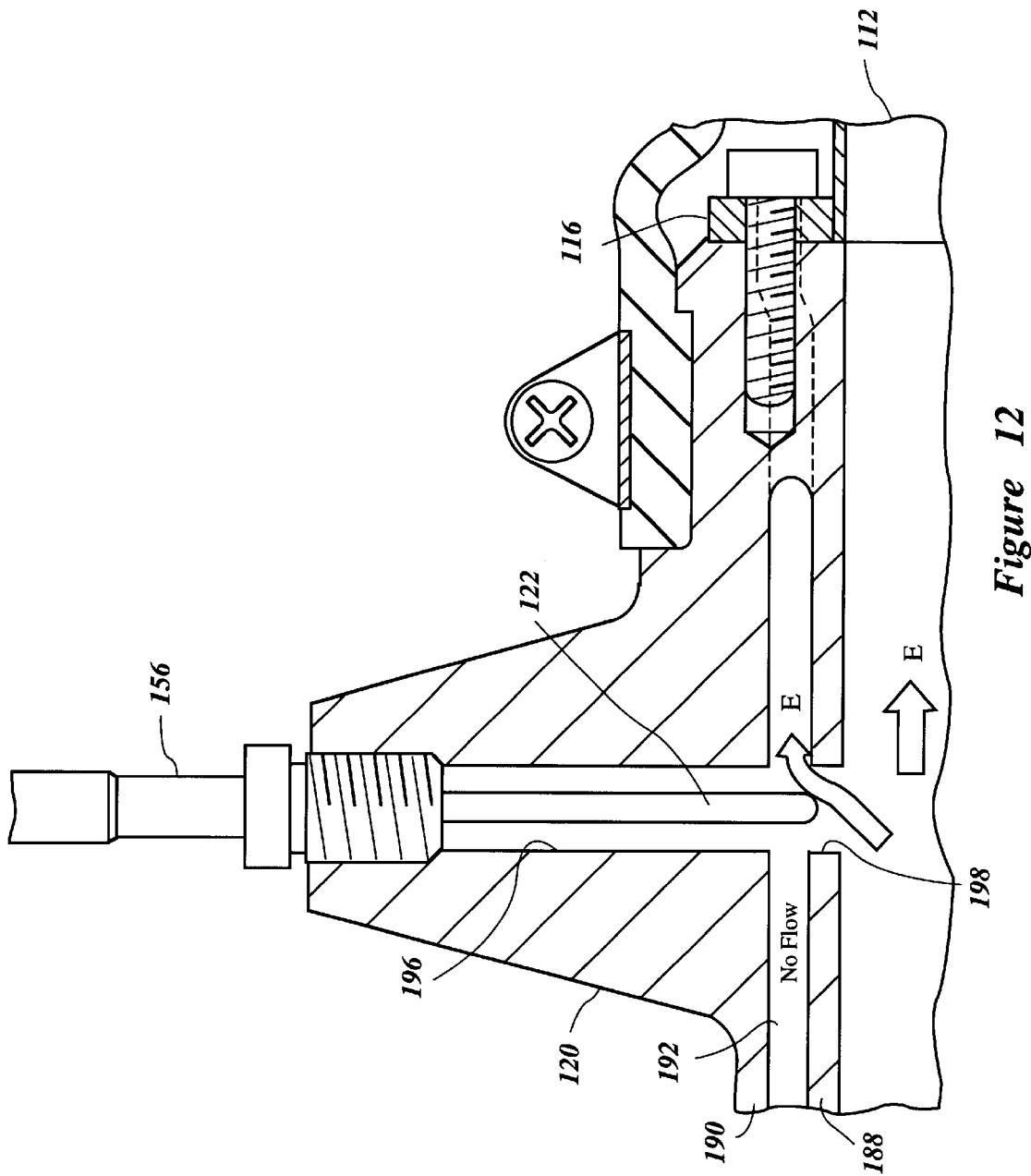
FIG. 12 is an exploded cross-sectional view of a portion of FIG. 11 illustrating an exhaust flow pattern case of a coolant flow stoppage within a coolant jacket.

With reference to FIG. 12, the inner tube 188 is provided with an aperture 198 proximate the sensor 122. The aperture 198 may be of any suitable geometric configuration; however, a desired configuration is simply a circular hole positioned proximate a distal tip of the sensor 122. More preferably, the aperture 198 is positioned along an elevated portion of the stinger 186 (or other exhaust system component in which it is mounted) such that a lowcoolant condition may be more readily detected (due to the coolant flowing through the lowest portion of the cooling jacket possible). The sensor may be inserted at least partially into the aperture, may be positioned at least partially within the water jacket, have a portion inserted into the water jacket, or be inserted downstream of a location where the water jacket empties into the exhaust stream.

With reference to FIG. 11, the output of the sensor 122 is received by a overheat prevention unit 200. The overheat prevention unit 200 can be any number of devices. For instance, a low capacity CPU may be used. The overheat prevention unit 200 may compare the output of the sensor 122 to either a map of values which indicate a normal functioning of the cooling system 160 or to a temporary chart of sensor readings. In the latter situation, in case of a rapid change of temperature, the overheat prevention unit 200 will detect a malfunctioning cooling system.

In case of a malfunctioning cooling system, the overheat prevention unit 200 may take any of many courses of action. For instance, in the illustrated embodiment, the unit 200 will alert the operator through the use of lights 202 for a slight temperature change and a warning buzzer 204 for a more extreme temperature change. A slight temperature variation may indicate a partial obstruction while an extreme variation is likely to indicate a substantially complete or complete blockage.

Other courses of action are also contemplated, such as, initiating a so-called "limp home" mode in which the engine is deliberately misfired on selected cylinders to allow the watercraft to slowly return to shore without significantly increasing the operating temperature. One of skill in the art will also recognize a variety of other courses of action which may be initiated upon a detection of a malfunction within the cooling system.

In the illustrated embodiment, a blockage of the cooling jacket 192 upstream of the aperture 198 will stop the coolant flow (i.e., NO FLOW in FIG. 12). As illustrated in FIG. 12, in such a situation, the exhaust gases E will pass through the aperture 198 and contact the end of the temperature sensor 122. As the cooling water temperature is significantly lower than the exhaust gas temperature, such an event will signal to the overheat prevention unit 200 that a malfunction in the cooling system has occurred. The advantageous configuration of the present overheat detection system allows substantially immediate detect of the presence of exhaust gases which may filter into the coolant jacket, an early indicator of a potential cooling system breakdown.

Figure 13:
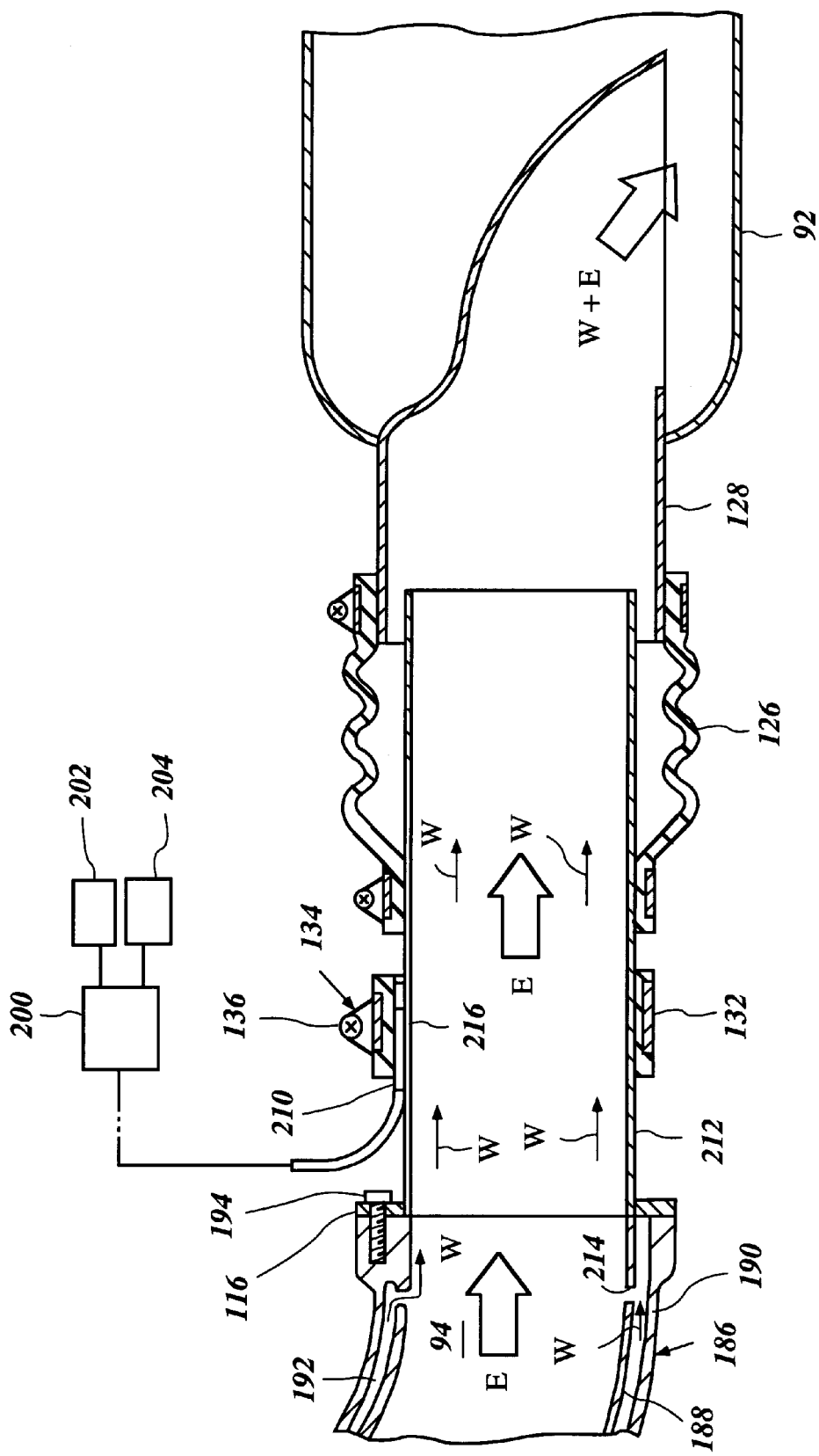
FIG. 13 is a cross-sectioned view of yet another embodiment of a flexible coupling boot and an overheat detection sensor arranged and configured in accordance with the present invention.

With reference to FIG. 13, another aspect of an overheat detection system is illustrated therein. According to this aspect, an exhaust pipe temperature sensor 210 is positioned along a portion of an exhaust pipe extension 212. While the sensor is illustrated upstream of the flexible boot, it is anticipated that the sensor may also be positioned downstream of the boot. In the illustrated embodiment, the cooling water W enters the exhaust flow E upstream of the sensor through discharge openings 214 in the inner tube 188. The exhaust pipe extension 212 is desirably formed from a highly heat conductive metal (i.e., aluminum) compared to the balance of the exhaust system 160 (i.e., stainless steel) such that changes in temperature are quickly conducted by the pipe from its inner wall to its outer wall. Moreover, the exhaust pipe extension 212 desirable has a smaller thickness as compared to the balance of the exhaust system 160.

In the illustrated embodiment, if the coolant flow through the cooling jacket 192 ceases, the exhaust temperature will increase due to the absence of the lower temperature cooling water. The increasing temperature is transferred through the extension pipe wall 216 to the temperature sensor 210. As above, the sensor's output is read and interpreted by an overheat prevention unit 200. In case of a quick rise in temperature or an aberrant temperature reading, the overheat prevention unit 200 will diagnose a cooling system malfunction. Such malfunction will result in a malfunction alert status. In the illustrated embodiment, the alert status means that lights 202 and buzzers 204 warn the operator of the possible malfunction and its likely degree of severity. As discussed above, one of skill in the art will readily appreciate a variety of other responses which could follow in due course.

Although the present invention has been described in the context of some exemplary environments, it is to be understood that the spirit of the invention is only to be interpreted in light of, and not limited by, these embodiments. Accordingly, the scope of the present invention is intended to be limited only to the reasonable scope of the following claims and their equivalents.

What is claimed is:

1. A watercraft comprising a hull having an engine compartment, an internal combustion engine mounted within the engine compartment, the engine comprising at least one cylinder and an exhaust system communicating with the cylinder, the exhaust system comprising a first portion and a second portion, the first portion connected to the second portion by a flexible coupling member, the first portion having a water jacket defined between a first member and a second member and an exhaust passage defined by the first member, the first member having a first opening such that the water jacket and the exhaust passage are in fluid communication, a sensor mounted proximate the first opening to detect a temperature and a second opening downstream of the first opening, the sensor being positioned at least partially within the water jacket adjacent the first opening.

2. The watercraft of claim 1, wherein the water jacket is also at least partially defined by an extension member and the second opening is forward of an outlet of the water jacket.

3. The watercraft of claim 2, wherein the outlet of the water jacket joins an outlet of the exhaust passage such that exhaust gases and coolant flows are merged.

4. The watercraft of claim 1, wherein the first member extends at least partway through to flexible coupling member.

5. The watercraft of claim 4, wherein the first member comprises an extension member connected to an end of a double shell exhaust conduit.

6. The watercraft of claim 5, wherein the conduit comprises a mounting fixture at a distal portion of the conduit, the mounting fixture adapted to receive the sensors.

7. The watercraft of claim 4, wherein the flexible coupling member is connected to the exhaust conduit and the extension member is disposed within flexible coupling member.

8. The watercraft of claim 1, wherein the flexible coupling member is seared to the first portion and the second portion using pipe clamps.

9. The watercraft of claim 1, wherein the second opening is downstream of an inwardly exposed portion of the flexible coupling member such that coolant will flow over the entire exposed length of tie flexible coupling member prior to flowing through the second opening.

10. A watercraft comprising a hull having an engine compartment, an internal combustion engine mounted wit the engine compartment, the engine comprising at least one cylinder and an exhaust system communicating with the cylinder, the exhaust system comprising a first portion and a second portion, the first portion connected to the second portion by a flexible coupling member, the first portion having a water jacket defined between a first member and a second member and an exhaust passage defined by the first member, the first member having an opening such that the water jacket and the exhaust passage are in fluid communication, a sensor mounted proximate the open to detect a temperature, wherein the sensor is mounted on an extension member having a reduced thickness relative to the first member.

11. The watercraft of claim 10, wherein the opening is disposed upstream of the extension member.

12. The watercraft of claim 10, wherein the extension member is formed from a highly heat-conductive metal compared to the balance of the exhaust system.

13. The watercraft of claim 10, wherein the flexible coupling is secure to the eon member.

14. The watercraft of claim 13, wherein the flexible coupling is secure to the extension member and to the second portion by a pair of pipe clamps.

15. The watercraft of claim 10, wherein the senor senses a temperature of an outside surface of the extension member.

16. The watercraft of claim 15, wherein the sensor senses the temperature at a portion of the exhaust system containing a mixed flow of exhaust gases and coolant.

17. A watercraft comprising a hull having an engine compartment, an internal combustion engine mounted within the engine compartment, the engine comprising at least one cylinder and an exhaust system communicating with the cylinder, the exhaust system comprising a first portion and a second portion, the first portion connected to the second potion by a flexible coupling member, the fist portion having a water jacket defined between a first member and a second member and an exhaust passage defined by the first member, the first member having an opening such that the water jacket and the exhaust passage are in fluid communication, a sensor mounted proximate the opening to detect a temperature, wherein the sensor is mounted on an extension member having an increased thermal conductivity relative to the first member.

18. The watercraft of claim 17, wherein the opening is disposed upstream of the extension member.

19. The watercraft of claim 17, wherein the extension member has a reduced thickness relative to the first member.

20. The watercraft of claim 17, wherein the flexible coupling is secured to the extension member.

21. The watercraft of claim 20, wherein the flexible coupling is secure to the extension member and to the second portion by a pair of pipe clamps.

22. The watercraft of claim 17, wherein the sensor senses a temperature of an outside surface of the extension member.

23. The watercraft of claim 22, wherein the sensor senses the temperature at a portion of the exhaust system con a mixed flow of exhaust gases and coolant.

24. A watercraft comprising a hull having an me compartment, an internal combustion engine mounted within the engine component, the engine comprising at least one cylinder and an exhaust system communicating with the cylinder, the exhaust system comprising a first portion and a second portion, the first portion connected to the second portion by a flexible coupling member, the first portion having a water jacket defined between a first member and a second member and an exhaust passage defined by the &a member, the first member having an opening such that the water jacket and the exhaust passage are in fluid communication, a sensor mounted proximate the opening to detect a temperature, wherein the sensor is accessible from outside of the second member and wherein the sensor is positioned downstream from the opening.

25. The watercraft of claim 24 further comprising an extension member positioned between the first portion and the second portion, wherein the opening is disposed upstream of the extension member.

26. The watercraft of claim 24 further comprising an extension member positioned between the first portion and the second portion, wherein the extension member has a reduced thickness relative to the first member.

27. The watercraft of claim 24 further comprising an extension member positioned between e first portion and the second portion, wherein the flexible coupling is secured to the extension member.

28. The watercraft of claim 27, wherein the flexible coupling is secure to the extension member and to the second portion by a pair of pipe clamps.

29. The watercraft of claim 24 further comprising an extension member positioned between the first portion and the second portion, wherein the sensor senses a temperature of an outside surface of the extension member.

30. The watercraft of claim 29, wherein the sensor senses the temperature at a portion of the exhaust system containing a mixed flow of exhaust gases and coolant.

31. The watercraft of claim wherein the sensor is mounted to an extension member and the extension member defines a merging location between gases and coolant.

32. The watercraft of claim 24 further comprising an extension member and the opening being positioned at an upstream end of the extension member.

33. The watercraft of claim 32, wherein the extension member comprises a mounting fixture adapted to receive the sensor.

34. The watercraft of claim 33, wherein the flexible coupling member is connected to the extension member and the second portion.

35. A watercraft of comprising an engine, an exhaust system coupled to the engine, and a cooling system for cooling at least a portion of the exhaust system, tho portion of the exhaust system cooled by the cooling system comprising an inner member and an outer member, a water jacket being defined between the inner member and the outer member, the water jacket comprising an inlet and an outlet, the inner member defining an exhaust passage, and a sensor system arranged to detect a substantial blockage in the water jacket, the sensor system comprising a sensor in electrical communication with an overeat prevention unit, the sensor being positioned near the outlet of the water jacket such that the sensor can detect the substantial blockage at substantially any location along the water jacket.

36. The watercraft of claim 35, wherein the sensor is in fluid communication with a portion of the water jacket.

37. The watercraft of claim 35, wherein the sensor is a temperature sensor.

38. The watercraft of claim 37, wherein the sensor is a thermocouple.

39. The watercraft of claim 35, further comprising warning devices which are activated by the overheat prevention unit when an abnormal reading is received from the sensor.

40. The watercraft of claim 35, wherein the sensor is mounted such that it may be removed from a location external to the outer member.

41. The watercraft of claim 35, wherein the outlet of the water jacket is in fluid communication with the exhaust system such that at least a portion of coolant flowing through the water jacket can be introduced into the exhaust system.

42. A watercraft comprising a hull having an engine compartment, an internal combustion engine mounted within said engine compartment, said engine comprising at least one cylinder arid an exhaust system communicating wit said cylinder, said exhaust system comprising a lint portion and a second portion, said first portion connected to said second portion by a flexible coupling member, said first portion having a water jacket defined between a first member and a second member and an exhaust passage defined by said first member, said first member having an opening such that said water jacket and said exhaust passage are in fluid communication, and a sensor that is mounted at a location that is in said opening or don se of said opening, said sensor being configured to detect a temperature such that said sensor can detect a substantial blockage in said water jacket at substantially any location along said water jacket or another failure of a cooling system associated with said water jacket.

43. The watercraft of claim 42, wherein said flexible coupling is positioned downstream of said opening.

44. The watercraft of claim 43, wherein said sensor is mounted upstream of said flexible coupling.

45. The watercraft of claim 43, wherein said flexible coupling member has an undulating structure.

46. The watercraft of claim 42, wherein said sensor is inserted at least partially into said opening.

47. The watercraft of claim 42, wherein an extension member extends distally of said second member.

48. The watercraft of claim 47, wherein said sensor is secured on an exterior surface of said extension member to detect said temperature of said surface resulting from a temperature within said extension member.

49. The watercraft of claim 42, wherein said sensor is mounted on an extension member having a reduced thickness relative to said member.

50. The watery of claim 42, wherein said sensor is mounted on an extension member having an increased thermal conductivity relative to said it member.

51. The watercraft of claim 42, said sensor is accessible firm outside of said second member.

52. A watercraft comprising an engine, an exhaust system coupled to said engine, said exhaust system comprising a first portion and a second portion, a flexible coupling connecting said first portion and said second portion, a cooling system extending along at least one of said first portion and said second portion of said exhaust system, said at least one of said first portion and said second portion of said exhaust system comprising an inner member and an outer member, a water jacket being defined between said inner member and said outer member, said water jacket comprising an inlet and an outlet, said inner member defining an exhaust passage, and a sensor system arranged to detect a substantial blockage in said water jacket, said sensor system comprising a sensor in electrical communication with an overheat prevention unit, said sensor being not upstream of said outlet of said water jacket at a location along said exhaust system such that said sensor can detect a substantial blockage in said water jacket at substantially any location along said water jacket or another failure of a cooling system associated with said water jacket.

53. The watercraft of claim 52, in said sensor is positioned generally upstream of said flexible coupling.

54. The watercraft of claim 52, wherein said flexible coupling is positioned generally downstream of said outlet of said water jacket.

55. The watercraft of claim 52, wherein said sensor is positioned upstream of at least a portion of said flexible coupling.

56. The watercraft of claim 52, wherein said sensor is positioned generally downstream of said outlet of said water jacket.

* * * * *

UNITED STATES PATENT AND TRADEMARK OFFICE
CERTIFICATE OF CORRECTION

PATENT NO.    : 6,461,208 B2
DATED         : October 8, 2002
INVENTOR(S)   : Suzuki et al.

It is certified that error appears in the above-identified patent and that said Letters Patent is hereby corrected as shown below:

Column 15,
Line 44, please delete "sensors" and insert therefore -- sensor --

Column 16,
Line 10, please delete "eon" and insert therefore -- extension --

Signed and Sealed this

Thirtieth Day of September, 2003

JAMES E. ROGAN
*Director of the United States Patent and Trademark Office*